UNITED STATES PATENT OFFICE.

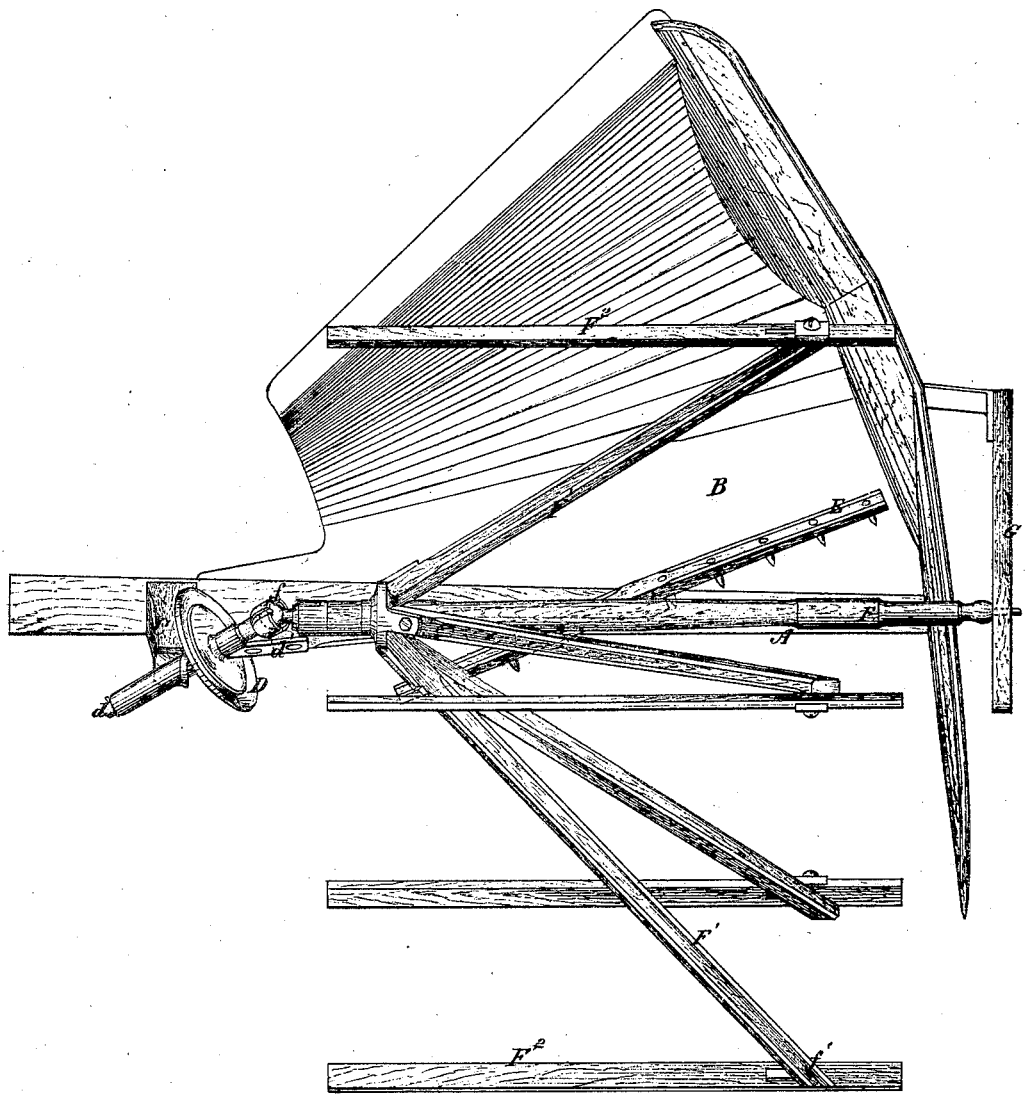

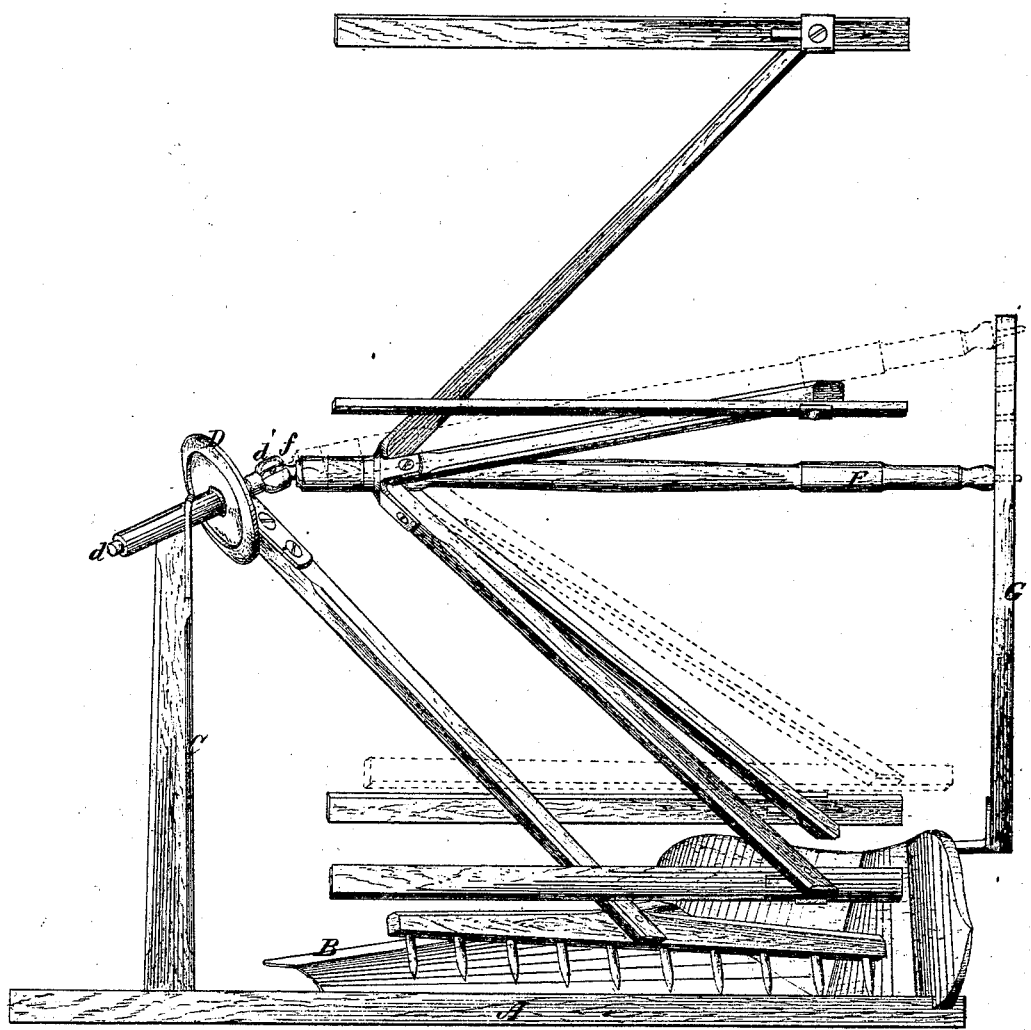

JOHN P. MANNY, OF ROCKFORD, ILLINOIS.

IMPROVEMENT IN HARVESTER-RAKES.

Specification forming part of Letters Patent No. 114,166, dated April 25, 1871.

*To all whom it may concern:*

Be it known that I, JOHN P. MANNY, of Rockford, in the county of Winnebago and State of Illinois, have invented certain new and useful Improvements in Harvester-Rakes, of which the following is a specification:

The first part of my invention relates to the reel. Its object is to render the reel adjustable relatively to the rake and platform without disturbing its harmonious co-operation with these parts, and this I accomplish by adjusting the reel-shaft radially around its point of connection with its driving-shaft.

My improvement further consists in combining a reel-shaft supported at both ends, but adjustable at its divider end only, with reel-beaters supported and adjusted at the same end to keep them in proper relation to the finger-beams.

My improvement further consists in combining a rotating rake with a reel, supported at one end by and driven from the rake-shaft, which intersects that of the reel at an acute angle.

The accompanying drawing shows so much only of a machine as is necessary to illustrate my improvements, which obviously may be adapted to organized harvesters differing widely in construction.

Figure 1 represents a plan, and Fig. 2 a front elevation.

The finger-beam A supports a platform, B, and post C, upon which an inclined shaft, $d$, is mounted. The rake E is mounted on a hub, D, on this shaft. The reel-shaft F has a ball, $f$, on its inner end, which rests in a slotted socket, $d'$, on the shaft $d$. A pin in the ball taking into the slots of the socket causes the two to turn together, while leaving the reel free to be adjusted, as hereinafter described. This form of joint might, however, be varied.

The outer end of the reel-shaft rests in a support, G, provided with a series of holes, or with a slot and set-screw, or some equivalent means, for setting that end of the reel-shaft higher or lower. The shaft is thus adjustable radially around the socket $d'$, as shown in dotted lines in Fig. 2.

The reel-arms $F^1$ are, by preference, secured to the shaft near its inner end, projecting diagonally outward therefrom. The reel-beaters $F^2$ are secured to these arms by set-screws $f'$, passing through slots at their outer ends, or other equivalent adjusting devices, so that their inner ends may be moved up or down around their point of connection with the arms, to compensate for the adjustment of the reel-shaft, and thus preserve the proper relation of the reel-beaters to the platform.

By the mode of construction above described I am enabled to use a reel of large diameter, which is desirable on many accounts, without the use of a high post or a long rake-arm.

The reel-shaft is above the point around which the rake rotates, in consequence of which arrangement, together with the angular relation of the rake and reel shaft, the rake is brought within the path of the reel in moving forward, but outside of the path of the reel in raking off.

I claim as my invention—

1. The combination of the inclined driving-shaft with the reel-shaft, intersecting it at an acute angle thereto, and radially adjustable around the joint which connects it with the driving-shaft, these members being constructed to operate in combination, substantially as hereinbefore set forth.

2. The combination of a reel-shaft supported at both ends, and adjustable radially around its driving-shaft, with reel-beaters supported at their divider ends only, and radially adjustable around their point of connection with the reel-arms, these parts being constructed to operate in combination, substantially as set forth.

3. The combination of the rotating rake with the reel supported at one end by and driven from the rake-shaft, these members being constructed to operate in combination, substantially as set forth.

In testimony whereof I have hereunto subscribed my name.

JOHN P. MANNY.

Witnesses:
 WILLIAM C. BLINN,
 LEWIS A. WEYBURN.